United States Patent [19]

Hammond

[11] 3,760,061
[45] Sept. 18, 1973

[54] HIGH-STRENGTH ACID CONTAINING H2O2 TO SCRUB SO2

[75] Inventor: Myers G. Hammond, Wilmington, Del.

[73] Assignee: E. I. du Pont de Nemours and Company, Wilmington, Del.

[22] Filed: Mar. 2, 1971

[21] Appl. No.: 120,337

[52] U.S. Cl. .............................................. 423/242
[51] Int. Cl. .......................................... C01b 17/00
[58] Field of Search .................... 23/25 Q; 423/242

[56] References Cited
FOREIGN PATENTS OR APPLICATIONS
670,966   1/1939   Germany ............................ 23/178
930,584   7/1963   Great Britain ...................... 23/178
1,234,912  2/1967   Germany ............................ 23/178

OTHER PUBLICATIONS
Copson et al., Industrial & Engineering Chemistry, Vol. 25, No. 8, pp. 909-911 (August 1933).

Primary Examiner—Oscar R. Vertiz
Assistant Examiner—Gregory A. Heller
Attorney—Lynn N. Fisher

[57] ABSTRACT

Sulfur dioxide can be oxidized to sulfuric acid by a process that involves contacting the $SO_2$ with an aqueous scrubbing solution of sulfuric acid containing hydrogen peroxide and/or the peroxy acids of sulfur in a gas-liquid contacting device in which the liquid scrubbing phase is made the continuous phase during the actual contacting. In this process the acid concentration of the scrubbing solution can be as high as 99 percent + by weight $H_2SO_4$.

The process is useful in the abatement of sulfur dioxide from waste gases created during the manufacture of sulfuric acid and also for abating $SO_2$ from other stack gases, thus alleviating pollution problems. Further, since the hydrogen peroxide or peroxy acids oxidize the sulfur dioxide to $H_2SO_4$, the process results in a useful product.

5 Claims, No Drawings

HIGH-STRENGTH ACID CONTAINING $H_2O_2$ TO SCRUB $SO_2$

BACKGROUND OF THE INVENTION

In recent years the elimination of various contaminants from our environment has become very important. One of the most troublesome contaminants is sulfur dioxide. Sulfur dioxide is produced in the manufacture of sulfuric acid and its abatement has become a problem for sulfuric acid manufacturers. It is also produced during the burning of many fuels.

Many processes have been proposed for the removal of $SO_2$ from such waste gases. Some of these processes involve the conversion of $SO_2$ to sulfur. Others involve $SO_2$ absorption, dry sorption, catalytic oxidation, or catalytic oxidation with interpass absorption. All of these existing and proposed processes have technological drawbacks or present economic problems to industry.

German Patents 1,234,912 and 670,966 and British Patent 930,584 disclose processes for scrubbing sulfur dioxide from waste gases by contacting the waste gases with an aqueous sulfuric acid solution, 35 percent to 80 percent $H_2SO_4$ by weight, containing the peroxy acids of sulfur, such as $H_2SO_5$ and $H_2S_2O_8$, and hydrogen peroxide in a scrubbing tower. The processes of these patents teach spraying the sulfuric acid solution into the waste gas stream. Thus, the gas phase is the continuous phase and the sulfuric acid solution is the discrete phase during actual interphase mass transfer.

Although these prior art processes also produce sulfuric acid from the $SO_2$ in the waste gases, the acid produced is of such low concentration that it has limited commercial use.

SUMMARY OF THE INVENTION

I have discovered a process for the scrubbing of sulfur dioxide from $SO_2$-containing waste gases by the employment of a gas-liquid contacting device in which the liquid scrubbing medium is made to be the continuous phase during the actual contacting. The scrubbing is effected with an aqueous sulfuric acid solution containing hydrogen peroxide and/or the peroxy acids of sulfur, e.g., peroxydisulfuric acid ($H_2S_2O_8$) and monoperoxysulfuric acid ($H_2SO_5$), also known as Caro's acid.

Although any concentration of acid can be used, the arrangement of the contacting device so that the liquid phase is continuous is especially advantageous with acid concentrations greater than 95 weight percent $H_2SO_4$ and results in an $H_2SO_4$ product of sufficient concentration that it has wide-spread commercial use.

DETAILED DESCRIPTION OF THE INVENTION

The process of the invention is applicable for treating various gas streams containing sulfur dioxide ($SO_2$). The $SO_2$ gaseous process stream could be the stack gas from an electrical power generation station, the stack gas from various industrial heating units, smelter off gases, oil refining off gas, the off gas from a sulfuric acid plant, the process gas in a sulfuric acid plant, the off gas from a coke plant, off gas from refuse burning or other burning generations.

The process of the invention involves bringing the $SO_2$-containing process stream into contact in a gas-liquid contacting device with an aqueous solution of 0 to 99 percent by weight sulfuric acid, the solution containing hydrogen peroxide and/or the peroxy acids of sulfur as oxidizing compounds.

Hydrogen peroxide can be added directly to the aqueous solution and then fed to the gas-liquid contact device, or the peroxy acid products of the electrochemical oxidation of sulfuric acid in an electrolytic cell can be added to the aqueous solution. These products are peroxydisulfuric acid, monoperoxysulfuric acid or Caro's acid, and hydrogen peroxide.

It is believed that peroxydisulfuric acid, monoperoxysulfuric acid, or hydrogen peroxide are the reactive species with the sulfur dioxide. However, other species of the peroxy acids of sulfur or their decomposition products could be involved. Thus the process of the invention is broadly applicable to the use of hydrogen peroxide, the peroxy acids of sulfur or their mixtures in the aqueous scrubbing solution.

Useful peroxy acids can be generated by the electrolysis of a sulfuric acid solution. In general, this is conducted by applying a direct electrical current having a current density ranging from 0.5 amp./cm.$^2$ to 2 amp./cm.$^2$ to an aqueous solution of sulfuric acid to electrolyze a portion of the acid, i.e., preferably 10 to 40 percent of the acid present.

The sulfuric acid in the cell should be maintained between 5° C. and 30° C., preferably 5° to 15° C. The concentration of the acid, although not critical, should be about 60 to 80 percent $H_2SO_4$. If the acid is below 40–50 percent $H_2SO_4$, $H_2$ and $O_2$ would be the products of electrolysis. Usually only a portion of the acid present is electrolyzed, i.e., up to 60 percent and preferably 10 to 40 percent. In a typical embodiment for a sulfuric acid plant, the preferred range would be 10 to 40 percent. The above operating limits are important in order to maintain high cell efficiency and to avoid anodic depolarization believed to be caused by the reactions:

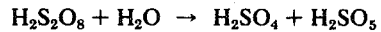

$$H_2S_2O_8 + H_2O \rightarrow H_2SO_4 + H_2SO_5$$
$$H_2SO_5 + 2\ OH^- \rightarrow H_2SO_4 + O_2 + H_2O + 2_e$$

The electrolysis cells which can be used are known in the art. For a representative electrolysis cell, the electrodes are constructed of platinum or tantalum-platinum, which can be clad over less costly materials of construction. Normal current density is about 1 amp./cm.$^2$, although current density may be as high as 2 to 3 amp./cm.$^2$ to increase the anode potential and, in turn, the current efficiency. Cell voltage will normally range from 5 to 6 volts.

In operation the residence time for the acid mixture in the cell should not exceed 15 minutes. Up to 60 percent, preferably 10 to 40 percent, of the acid mixture is electrolyzed as it passes through the cell; improved cell efficiency is obtained by carrying out only this partial electrolysis of $H_2SO_4$ per pass through the cell. Cell efficiency can be improved if the acid mixture contains a small quantity of dissolved $SO_2$. Normally, cell efficiency is in the range of 50 to 95 percent, depending upon operating conditions.

In another embodiment, preformed hydrogen peroxide solution is added directly to the aqueous scrubbing medium containing 0 to 99 percent by weight sulfuric acid. The rate of addition can be controlled by sensing the concentration of $SO_2$ in the scrubber tail gases and adding sufficient peroxide to oxidize the $SO_2$ to the desired extent.

An important aspect of the process of the invention is that the liquid phase is made the continuous phase, during the actual gas-liquid contacting, for example, by sparging the gas into a liquid. With this feature, very high concentrations of sulfuric acid can be used and effective $SO_2$ absorption and conversion to $H_2SO_4$ is still achieved. Heretofore, employment of gas-liquid contacting devices in which the gas was made the continuous phase during interphase mass transfer, such as spray towers and packed towers, permitted use of acid concentrations ranging up to only 80 weight percent $H_2SO_4$. The $H_2SO_4$ thus produced by the scrubbing operation was of marginal utility.

As the acid concentration in the aqueous scrubbing medium is increased, the solubility of $SO_2$ in the aqueous scrubbing medium decreases, and, more importantly, the reaction rate of dissolved $SO_2$ and hydrogen peroxide or peroxy acids of sulfur to form $H_2SO_4$, decreases. At sulfuric acid concentrations above about 80 percent in the aqueous scrubbing medium, the low reaction rate of $SO_2$ with hydrogen peroxide or peroxy acids of sulfur makes the use of conventional gas-liquid contacting equipment, wherein the gas phase is continuous, impractical for significant removal of $SO_2$ from gaseous streams. The reason for this is that, in the more concentrated solutions, the aqueous scrubbing medium more quickly becomes saturated with $SO_2$ because of the slower reaction rate of dissolved $SO_2$ with hydrogen peroxide and peroxy acids of sulfur present in the aqueous scrubbing medium. If, however, the liquid phase is made continuous during the actual gas-liquid contacting, significant removal of $SO_2$ from the incoming gas is achieved even with very short gas contact times of only a few seconds. It is desirable to provide liquid hold-up times of from about 10 seconds with low sulfuric acid concentrations to as much as a few hours at high sulfuric acid concentrations in order to give the dissolved $SO_2$ time to react with the hydrogen peroxide or peroxy acids of sulfur present in the aqueous scrubbing medium. The necessary liquid hold-up time can be achieved by proper design of the liquid phase continuous contacting device.

Examples of gas-liquid contact devices in which the process of the invention can be practiced, i.e., in which the gas is the dispersed phase, are a simple gas sparger used in conjunction with a turbine-type impeller immersed in the liquid to increase the degree of gas dispersion, or a bubble-cap tray tower. Another device is the gas entrainment apparatus, in which a jet of liquid impinging on a pool of liquid entrains gas bubbles from the gas space into the pool. These devices can all be used singly or in cascades.

The distance the gas bubbles travel in the liquid phase can be as little as one inch but preferably, will be three inches or greater. Obviously, fine gas bubbles are preferred over large ones for improved gaseous diffusion.

The acid concentration in the liquid phase can range from 0% to 99 percent, and even contain free $SO_3$. However, for reasons of ease of marketability, the preferred acid concentration is 95 percent to 99 percent $H_2SO_4$ by weight.

The operating temperature of the absorption-oxidation reaction is not critical and can range from near the freeze-point of the acid to near the boiling-point of the acid. Preferred are temperatures ranging from 50° to 90° C., since the reaction is favored by higher temperatures. Further this range is the normal temperature of the gaseous effluent from a contact sulfuric acid plant.

The hydrogen peroxide/peroxy acid content of the scrubbing acid should be at least 250 ppm. and can range up to 5 percent or even higher, calculated as weight percent $H_2O_2$. In the more highly concentrated solutions of sulfuric acid, hydrogen peroxide reacts with the acid to some extent to form Caro's acid, $H_2SO_5$.

The $SO_2$ concentration in the waste gas to be treated can range from 500 ppm. to 5000 ppm or even higher. As the $SO_2$ is absorbed into the liquid phase and reacted to form $H_2SO_4$, the equivalent quantity of acid will normally be tapped off from the liquid phase in the contacting apparatus, either intermittently or continuously. This sidestream can be blended with other acid or used as is. In the process embodiment wherein staging is employed, e.g., in a bubble cap tower, a portion of the liquid effluent can be diverted and recycled to the top of the staging unit for reuse.

Addition of hydrogen peroxide or the peroxy acids to the scrubbing liquid will be necessary to balance the amount consumed in the oxidation of $SO_2$, decomposition losses, and physical losses sustained via the sidestream draw-off and by volatilization. This make-up can be done either intermittently or continuously.

The $SO_2$ concentration in the gaseous effluent from the gas-liquid contact device can be as low as 500 ppm. by volume or even lower. The $SO_2$ leakage can usually be reduced by lengthening the length of travel of the gas bubbles through the liquid. A preferred contact time is from 1 to 15 seconds and a most preferred time is 2 to 8 seconds.

The invention is exemplified in the following examples. Parts are by weight or volume unless otherwise indicated.

EXAMPLE 1

A dip tube ending in a fritted cylinder is attached to a resin kettle so that the top of the cylinder is one inch below the surface of the liquid contained therein. The liquid is agitated with a magnetic stirring bar at a moderate rate. When a gas mixture containing 4300 ppm. $SO_2$, 10.3 percent $O_2$, and balance $N_2$, all by volume, is bubbled through the fritted cylinder at a rate of about 660 ml./min., into 700 gm. concentrated reagent grade sulfuric acid containing the equivalent of 840 ppm. $H_2O_2$ by weight (temperature 79° C.) the effluent gas contains approximately 850 ppm $SO_2$ by volume. The gaseous $SO_2$ concentration is measured by injecting samples into a gas chromatograph.

EXAMPLE 2

Example 1 was repeated except that the inlet gas flow rate was about 600 ml./min. and the peroxy compound level in the acid is the equivalent of about 265 ppm. $H_2O_2$ by weight. The effluent gas contained approximately 900 ppm. $SO_2$ by volume.

I claim:

1. A process for oxidizing and removing the $SO_2$ contained in waste gases comprising contacting the $SO_2$ containing waste gas with an aqueous scrubbing solution of up to 99 percent by weight sulfuric acid and an oxidizing compound of the group consisting of hydrogen peroxide, the peroxy acids of sulfur, or mixtures thereof at a temperature above the freezing point but below the boiling point of said sulfuric acid solution in a gas-liquid contacting device wherein the liquid scrubbing solution is made the continuous phase during the actual contacting, the time of contact being sufficient to allow the dissolved $SO_2$ to react with said oxidizing agents.

2. The process of claim 1 wherein the acid concentration is 95 percent to 99 percent by weight sulfuric acid.

3. The process of claim 1 wherein the $SO_2$ containing waste gas is the off-gas stream from sulfuric acid manufacture.

4. The process of claim 2 wherein the $SO_2$ containing waste gas is the off-gas stream from sulfuric acid manufacture.

5. The process of claim 1 wherein the oxidizing compound is hydrogen peroxide.

* * * * *